United States Patent [19]

Wald

[11] 4,405,524
[45] Sep. 20, 1983

[54] ANTHRAQUINONE DYES AND METHOD OF USE

[75] Inventor: Roland Wald, Huningue, France

[73] Assignee: Sandoz Ltd., Basel, Switzerland

[21] Appl. No.: 22,979

[22] Filed: Mar. 23, 1979

[30] Foreign Application Priority Data

Apr. 7, 1978 [CH] Switzerland .................. 3774/78

[51] Int. Cl.³ ............... C07C 103/76; C07C 143/665; C09B 1/28; C09B 1/36
[52] U.S. Cl. .................................. 260/372; 260/377; 260/239 BF; 260/239.3 R; 8/475; 8/476; 548/474; 548/528; 546/243
[58] Field of Search .................. 260/372, 377; 8/475, 8/476

[56] References Cited

U.S. PATENT DOCUMENTS

| | | | |
|---|---|---|---|
| 3,499,915 | 3/1970 | Schwander | 260/372 |
| 3,646,071 | 2/1972 | Frey et al. | 260/377 |
| 3,823,168 | 7/1974 | Hohmann et al. | 260/377 |
| 3,872,137 | 3/1975 | Frey et al. | 260/372 |

FOREIGN PATENT DOCUMENTS 1644552 2/1971 Fed. Rep. of Germany .
1383355 2/1964 France .

OTHER PUBLICATIONS

*The Condensed Chemical Dictionary*, 8th Ed., p. 26, Hawley et al., 1971, Van Nostrand Reinhold Co., N.Y., N.Y.
*Organic Chemistry*, 3rd Ed., p. 287, Morrison et al., 1973, Allyn and Bacon Inc., Boston, MA.

*Primary Examiner*—Delbert E. Gantz
*Assistant Examiner*—Raymond K. Covington
*Attorney, Agent, or Firm*—Gerald D. Sharkin; Richard E. Vila; Thomas C. Doyle

[57] ABSTRACT

The present invention relates to anthraquinone compounds of formula I,

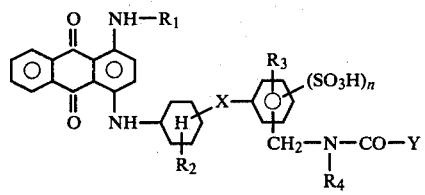

in which
  $R_1$ is alkyl or cycloalkyl,
  $R_2$ is hydrogen, methyl or ethyl,
  $R_3$ is hydrogen or methyl,
either
  $R_4$ is hydrogen, methyl or ethyl, and Y—CO— is the radical of an organic aliphatic aromatic or araliphatic carboxylic acid containing a total of 2 to 12 carbon atoms,
or
  $R_4$ together with the radical Y—CO— and the nitrogen atom to which they are bound signify a cyclic imide of a dicarboxylic acid containing a total of 4 to 8 carbon atoms,
  X is a direct bond or $(C_{1-3})$alkylene,
  n is 0 or 1 which compounds are useful as colorants. More particularly those compounds where n is 1 are useful as anionic dyestuffs and those compounds where n is 0 are useful as pigments.

20 Claims, No Drawings

ANTHRAQUINONE DYES AND METHOD OF USE

The present invention relates to anthraquinone compounds, their production and use as dyes.

More particularly, the present invention relates to compounds of formula I,

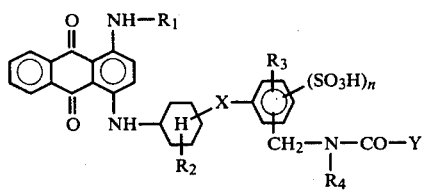

in which
$R_1$ is alkyl or cycloalkyl,
$R_2$ is hydrogen, methyl or ethyl,
$R_3$ is hydrogen or methyl,
either
$R_4$ is hydrogen, methyl or ethyl, and Y—CO— is the radical of an organic aliphatic aromatic or araliphatic carboxylic acid containing a total of 2 to 12 carbon atoms,
or $R_4$ together with the radical Y—CO— and the nitrogen atom to which they are bound signify a cyclic imide of a dicarboxylic acid containing a total of 4 to 8 carbon atoms,
X is a direct bond or $(C_{1-3})$alkylene,
n is 0 or 1
which compounds, where n is 1, are in free acid or salt form.

Where $R_1$ is alkyl it may be primary, secondary or tertiary. When $R_1$ is a primary alkyl radical this may be linear or branched, preferably the latter, and advantageously contains 1 to 12, preferably 1 to 9, especially 6 to 9 carbon atoms. Where $R_1$ is a secondary alkyl radical such radical preferably contains 3 to 12, more preferably 3 to 9 and especially 6 to 9 carbon atoms. When $R_1$ is a tertiary alkyl radical such radical preferably contains 4 to 12 and more preferably 6 to 9 carbon atoms.

Where $R_1$ is cycloalkyl it is preferably cyclohexyl which is unsubstituted or substituted by a total of up to three lower alkyl groups and the total number of carbon atoms in such substituted cyclohexyl is up to 12, preferably up to 9. Preferably any cycloalkyl as $R_1$ is cyclohexyl which is optionally substituted by 1 to 3 methyl groups. More preferably any cycloalkyl as $R_1$ is unsubstituted cyclohexyl, 2-,3- or 4-methylcyclohexyl, 2,3-dimethylcyclohexyl or 3,3,5-trimethylcyclohexyl, with unsubstituted cyclohexyl being especially preferred.

$R_1$ is preferably $R_1'$, where $R_1'$ is a primary $(C_{1-9})$-alkyl, secondary $(C_{3-9})$alkyl or cyclohexyl which is optionally substituted by up to three methyl groups.

More preferably $R_1$ is $R_1''$, where $R_1''$ is secondary $(C_{3-9})$-alkyl or cyclohexyl which is optionally substituted by up to three methyl groups.

Most preferably $R_1$ is $R_1'''$, where $R_1'''$ is secondary $(C_{6-9})$-alkyl or cyclohexyl which is optionally substituted by up to three methyl groups, with cyclohexyl or substituted cyclohexyl being especially preferred.

Any methyl as $R_2$ is preferably para to the —NH— group.

$R_2$ is preferably $R_2'$, where $R_2'$ is hydrogen or methyl in the position para to the —NH— group. More preferably $R_2$ is hydrogen.

$R_3$ is preferably hydrogen.

$R_4$ is preferably $R_4'$, where $R_4'$ is hydrogen, methyl or ethyl or together with —N—CO—Y forms phthalimide. More preferably $R_4$ is $R_4''$ where $R_4''$ is hydrogen or together with —N—CO—Y forms phthalimide. Most preferably $R_4$ is hydrogen.

Y—CO— as the radical of an aliphatic, aromatic or araliphatic carboxylic acid may contain hetero atoms such as oxygen, nitrogen or sulphur and further may bear substituents which may be split off as anions especially halogen atoms, or may bear non-ionogenic substituents such as alkyl or alkoxy groups provided that the total number of carbon atoms in the group Y is not greater than 11. Preferably, however, the group Y contains no hetero atoms and no further substituents except those which may be split off as anions. Where Y—CO— is the radical of an aromatic carboxylic acid, the aromatic nucleus is preferably phenyl or phenyl monosubstituted by chloro, bromine or methyl, especially phenyl. Where Y—CO— is the radical of an aliphatic carboxylic acid this also includes cycloaliphatic carboxylic acid radicals. The preferred cycloaliphatic radical is cyclohexyl. Preferably, however, any aliphatic carboxylic acid radical is open chain and may be saturated or ethylenically unsaturated. Thus, when Y is aliphatic it is preferably $(C_{1-7})$, more preferably $(C_{1-4})$, most preferably $(C_{1-2})$alkyl optionally substituted by halogen or is $(C_{2-5})$, more preferably $(C_{2-3})$alkenyl optionally substituted by halogen especially those alkenyl radicals where the double bond is between the α and β carbon atoms. When Y is alkyl or alkenyl such groups are preferably unsubstituted or substituted by one or two halogen atoms, one of which is on the α-carbon atom.

By halogen is to be understood chlorine or bromine. The preferred halogen is chlorine.

Preferably Y is Y' and $R_4$ is $R_4'$ where either, Y' is phenyl; or phenyl monosubstituted by methyl, chlorine or bromine; $(C_{1-7})$alkyl; $(C_{1-7})$alkyl substituted by up to two halogen atoms; $(C_{2-5})$alkenyl; $(C_{2-5})$alkenyl substituted by up to two halogen atoms; or cyclohexyl and $R_4'$ is hydrogen, methyl or ethyl or, Y'—CO together with $R_4'$ and the nitrogen atom forms phthalimide.

More preferably Y is Y'' and $R_4$ is $R_4''$ where either, Y'' is phenyl,

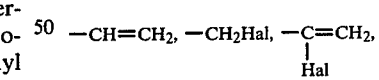

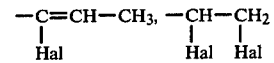

and $R_4''$ is hydrogen or, Y'''—CO and $R_4''$ together with the nitrogen atom form phthalimide.

Even more preferably Y is Y''', where Y''' is

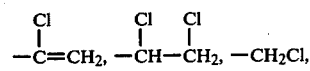

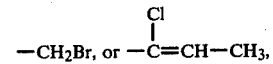

with —CH₂Cl being most preferred.

When X is a direct bond it is preferably para to the —NH— group. When X is alkylene, the alkylene group may be in any position relating to the —NH— group, however, preferably any alkylene as X is ortho or para to the —NH— group, more preferably ortho, especially with X is methylene.

Preferably X is X', where X' is

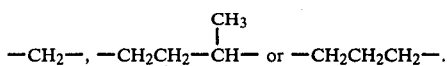

More preferably X is X", where X" is

especially —CH$_2$—.

Preferred compounds of formula I are those of formula I'

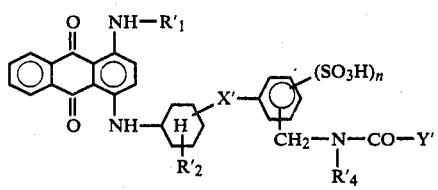

in which R$_1'$, R$_2'$, R$_4'$, X' and Y' are as defined above.

More preferred compounds are those of formula I' where R$_1'$ is R$_1''$, Y' is Y'' and R$_4'$ is R$_4''$, especially those wherein X' is X".

Even more preferred compounds are those of formula I', in which R$_1'$ is R$_1'''$ and R$_4'$ is hydrogen, especially those when X' is X".

The most preferred compounds of formula I are those of formula I"

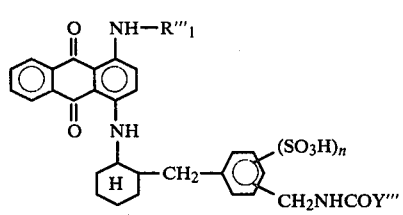

especially those wherein Y''' is —CH$_2$Cl.

Of the compounds of formulae I, I' and I" those in which n is 1 are preferred, especially the salts thereof.

When n is 1 and the compounds of formula I are in the salt form, the cation of the salt form of the sulpho group is not critical and may be any non-chromophoric cation common in anionic dyestuffs. Examples of suitable cations are sodium, lithium, potassium, ammonium, mono-, di- or triethanolammonium or mono-, di- or triisopropanolammonium.

The present invention further provides a process for the production of a compound of formula I, as defined above, comprising reacting a compound of formula II,

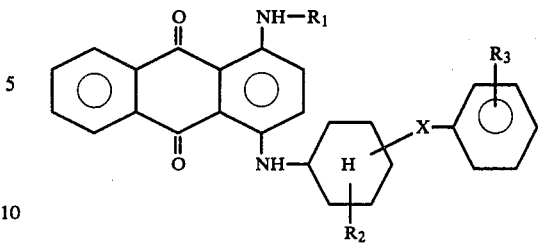

with a compound of formula III,

wherein

Z is a leaving group, and

R$_4$ is as defined above and where n is 1, sulphonating the resulting product.

Suitably, Z is hydroxyl or halogen. Preferably Z is hydroxyl. The reaction is carried out in accordance with known methods. Preferably the reaction is carried out in the presence of 90–100% more preferably 92–98% sulphuric acid. Suitable reaction temperatures are in the range of from 0° to 30° C., preferably 15° to 25° C. The product obtained may be separated in accordance with known procedures. When a compound of formula I in which n is 1 is desired, the product of the reaction of a compound of formula II with a compound of formula III may be sulphonated without isolation from the reaction mixture. However, it is preferred to isolate the product before carrying out the sulphonation step.

Sulphonation may be carried out in accordance with known methods. Preferably oleum is employed, especially 10–65%, more preferably 20–50% oleum. Suitable sulphonation temperatures are in the range of from 0° to 25° C., preferably 0° to 5° C. The sulphonated product may be isolated in accordance with known methods and may be neutralized if the salt form of the compounds of formula I is desired.

The compounds of formula II and III are either known or may be prepared in accordance with known methods from available starting materials.

The compounds of formula I are useful as dyestuffs. More particularly, the compounds of formula I wherein n is 0 are useful as pigments for dyeing synthetic or semisynthetic, hydrophobic organic substrates in the mass. Suitable such substrates include polyester, viscose, polyolefins or synthetic polyamides. The compounds of formula I where n is 1 are useful as dyestuffs for dyeing or printing anionic dyeable, especially textile, substrates. Suitable such substrates include natural or regenerated cellulose, natural or synthetic polyamides, polyurethanes or basically modified polyolefins. The preferred substrates are natural or synthetic polyamides. The substrate may be in fibre, fabric or yarn form.

Dyeing or printing may be carried out in accordance with known methods. The dyestuffs wherein n is 1 may be mixed with blending agents such as dextrin.

The compounds of formula I where n is 1, especially when in salt form, are well water-soluble resistant to the action of salts and of hard water. They also build-up on synthetic polyamides from a neutral to weakly acid bath. The dyeings and prints obtained therewith are even, brilliant blue and possess notable light fastness and wet fastnesses. The dyes may be used for dyeing alone or in admixture with other dyes having similar properties.

The following Examples further serve to illustrate the invention. In the Examples, all parts and percentages are by weight and the temperatures are in degrees Centigrade.

EXAMPLE 1

A mixture of 40 g of 1-methoxy-4-(2'-benzylocyclohexylamino)-anthraquinone and 120 ml 2,3-dimethylcyclohexylamine is stirred for 10 hours at 135°. The mixture is then allowed to cool to 50° and 100 ml of methanol are added thereto. The mixture is cooled such that the reaction product precipitates. After filtration and washing with methanol a compound of formula

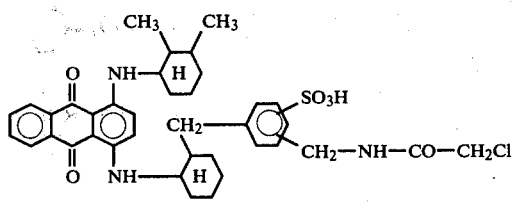

is obtained.

10.4 g of this compound is mixed well with 3 g N-methylene-chloroacetamide and added portionwise to 50 g 95% sulphuric acid at a temperature of 12° to 14°. The mixture is stirred for 3 hours at this temperature, subsequently 50 g 65% oleum is added dropwise at a temperature of 0° to 3° and the whole is stirred for 4 hours. The mixture is poured onto ice, the precipitated dyestuff is filtered and washed with an 8% potassium chloride solution. The product which in the free acid form is of formula

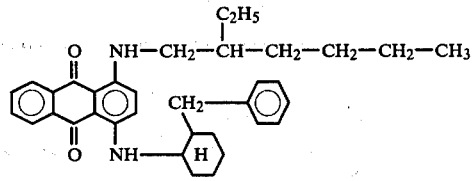

is made into a paste with a little water, adjusted to a pH value of 7 with potassium hydroxide and dried at 50° in vaccuo. The dyestuff has good water solubility and dyes wool and synthetic polymaides in very brilliant blue shades. The dyeings have good light- and wet fastnesses.

EXAMPLE 2

Instead of the 2,3-dimethylcyclohexylamine used in Example 1, the same amount of 3,3,5-trimethylcyclohexylamine is employed following the same procedure as described in Example 1. The product obtained is of formula

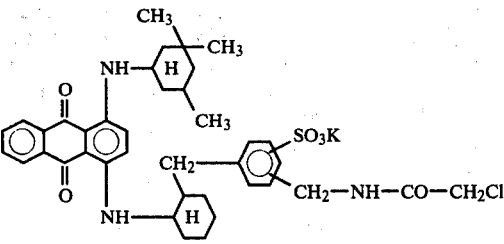

and has good water solubility and also dyes synthetic polyamides and wool in very brilliant blue shades. The dyeings have good light- and wet fastnesses.

EXAMPLE 3

A homogeneous mixture of 10.5 g of the compound of formula

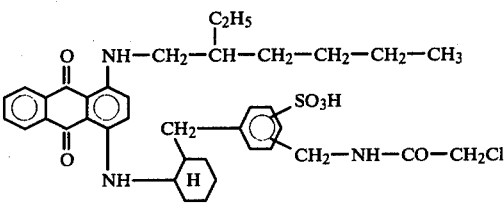

and 3 g N-methylol-chloroacetamide is added, at a temperature of 18° to 22°, to 50 g of 92% sulphuric acid. The reaction mixture is stirred at this temperature for 2 hours and then poured onto ice. The precipitate of the condensation product is filtered and the filter cake is washed with water until the filtrate has a pH value of 6.5 to 7. The product is dried in vaccuo at 60° and then is dissolved in 50 g of 25% oleum at 0° to 5°. The mixture is stirred for 2 hours at this temperature and is then poured onto ice. The precipitate is filtered and the filter cake is washed with a 10% sodium chloride solution. The product, which in the free acid form, is of formula $$\text{[structure]}$$

is added to water and lithium hydroxide is added to give a pH value of 7. The dye solution is evaporated to dryness in a vaccuum at 60°. A blue powder is obtained which gives dyeings on wool and nylon of brilliant blue shades having good wet fastnesses. The dyestuff has good water solubility and is resistant to the action of salts and lime. The sodium salt form or potassium salt form of the dye may be made in analogous manner.

EXAMPLE 4

A mixture of 19 g quinizarin, 5 g leucoquinizarin, 20 ml 2-benzylcyclohexylamine and 80 ml chlorobenzene is stirred in a nitrogen atmosphere at a temperature of 130° for 10 hours. 50 ml cyclohexylamine are added thereto and the whole is stirred at a temperature of 125° for 12 hours. The temperature is allowed to drop to 65° and then 40 ml ethylalcohol are added thereto whereby the reaction product precipitates. The latter is filtered and washed with ethylalcohol. 10 g of the 1-cyclohexylamino-4-(2'-benzylcyclohexylamino)anthraquinone, after recrystallization from isopropanol, are mixed with 3 g N-methylol-chloroacetamide and following the procedure of Example 3 a dyestuff, which in the free acid form, is of formula

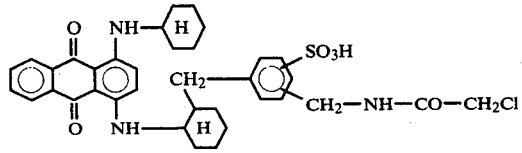

is obtained. The dyestuff in the lithium-, potassium- and sodium salt form has good water solubility and gives even dyeings on wool and synthetic polyamides from a neutral to weakly acid dyebath. The dyeings have good light- and wet fastnesses such as fastness to water, washing, sweat and milling.

In the following Table further anthraquinone dyestuffs which may be prepared in analogy with the procedure described in Example 3, are given. They correspond, in the free acid form to formula

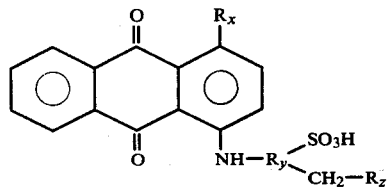

The dyestuffs in the lithium-, sodium- and potassium salt form have good water solubility and dye wool and synthetic polyamides in brilliant blue shades.

TABLE

| Example No. | $-R_x$ | $-NH-R_y\big<$ | $-R_z$ |
|---|---|---|---|
| 5 | $-NH-\langle H\rangle$ | $-NH-\langle H\rangle\text{-CH}_2-\langle\rangle$ | $-NH-CO-CH_2Br$ |
| 6 | " | " | $-NH-CO-CH=CH_2$ |
| 7 | " | " | $-NH-CO-C(Cl)=CH_2$ |
| 8 | " | " | $-NH-CO-C(Br)=CH_2$ |
| 9 | " | " | $-NH-CO-CH(Cl)-CH_2Cl$ |
| 10 | " | " | $-NH-CO-CH_2-CH_3$ |
| 11 | " | " | $-NH-CO-CH_2CH_2CH_3$ |
| 12 | " | " | $-NH-CO-\langle\rangle$ |
| 13 | " | " | $-NH-CO-\langle H\rangle$ |
| 14 | " | " | $-N(\text{phthalimido})$ |
| 15 to 24 | $-NH-\langle H\rangle(CH_3)(CH_3)$ | " | as Examples 5 to 14 |
| 25 to 34 | $-NH-\langle H\rangle(CH_3)(CH_3)(CH_3)$ | " | as Examples 5 to 14 |

TABLE-continued

| Example No. | —$R_x$ | —NH—$R_y$ | —$R_z$ |
|---|---|---|---|
| 35 | —NH—CH(CH₃)—CH₂—CH₃ | " | —NH—CO—CH₂Cl |
| 36 | —NH—(2-methylcyclohexyl) | " | " |
| 37 | —NH—(3-methylcyclohexyl) | " | " |
| 38 | —NH—(4-methylcyclohexyl) | " | " |
| 39 | —NH—(4-n-butylcyclohexyl) | " | " |
| 40 | —NH—CH(CH₃)—CH₂—CH₃ | —NH—(cyclohexyl)—CH₂—(2,6-dimethylphenyl) | " |
| 41 | —NH—(cyclohexyl) | " | " |
| 42 | —NH—(2-methylcyclohexyl) | " | " |
| 43 | —NH—(3-methylcyclohexyl) | " | " |
| 44 | —NH—(4-methylcyclohexyl) | " | " |
| 45 | —NH—(4-n-butylcyclohexyl) | " | " |
| 46 | —NH—(2,3-dimethylcyclohexyl) | " | " |
| 47 | —NH—(2,4,6-trimethylcyclohexyl) | " | " |
| 48 | —NH—CH(CH₃)—CH₂—CH₃ | —NH—(cyclohexyl)—CH₂—CH₂—(2,6-dimethylphenyl) | " |
| 49 | —NH—(cyclohexyl) | " | " |
| 50 | —NH—(2,3-dimethylcyclohexyl) | " | " |

TABLE-continued
| Example No. | —Rx | —NH—Ry | —Rz |
|---|---|---|---|
| 51 | 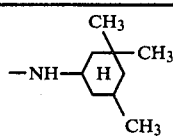 | " | " |
| 52 | 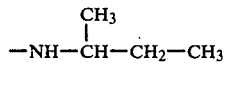 | 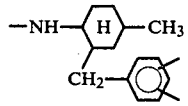 | " |
| 53 | 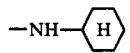 | " | " |
| 54 | 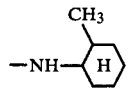 | " | " |
| 55 | 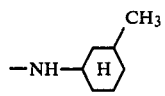 | " | " |
| 56 | 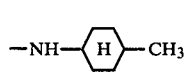 | " | " |
| 57 | 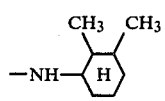 | " | " |
| 58 | 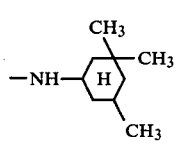 | " | " |
| 59 to 65 | as Examples 52 to 58 | 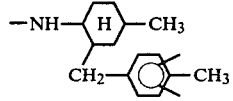 | " |
| 66 to 72 | as Examples 52 to 58 | 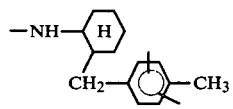 | " |
| 73 to 79 | as Examples 52 to 58 | 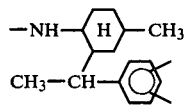 | " |
| 80 to 86 | as Examples 52 to 58 | 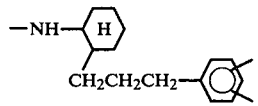 | " |
| 87 | 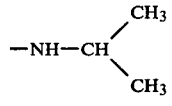 | 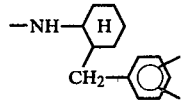 | " |

TABLE-continued

| Example No. | $-R_x$ | $-NH-R_y$ | $-R_z$ |
|---|---|---|---|
| 88 | $-NH-CH(CH_2CH_3)-CH_2CH_2CH_2CH_3$ | " | " |
| 89 | $-NH-CH(CH_3)-C(CH_3)_2-CH_3$ | " | " |
| 90 | $-NH-CH(CH_2-CH(CH_3)_2)(CH_2-CH(CH_3)-CH_3)$ | " | " |
| 91 | $-NH-CH(CH(CH_3)_2)(CH(CH_3)_2)$ | " | " |
| 92 to 96 | as Examples 87 to 91 | 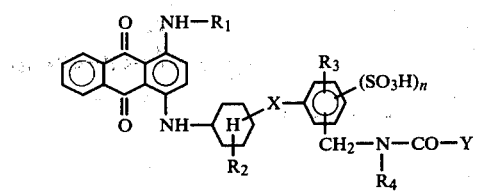 | " |

Application Example

1 Part of the dye prepared as described in Example 1 is dissolved in dyebath containing 6000 parts water at 40°; subsequently 4 parts ammoniumsulphate are added thereto. 100 Parts Nylon 66 yarn are added to the dyebath which is heated to the boil over a period of 30 minutes and held at this temperature for 1 hour. The dyed substrate is removed, rinsed and dried. A brilliant blue even dyeing is obtained.

Wool may be dyed in accordance with the same procedure.

In analogy with the above procedure the dyes of Examples 2 to 96 may be used to dye Nylon 66 and wool.

What is claimed is:
1. A compound of formula I,

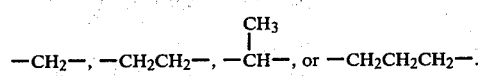

in which
$R_1$ is alkyl or cycloalkyl,
$R_2$ is hydrogen, methyl or ethyl,
$R_3$ is hydrogen or methyl,
$R_4$ is hydrogen, methyl or ethyl, and Y—CO— is the radical of an organic aliphatic aromatic or araliphatic carboxylic acid containing a total of 2 to 12 carbon atoms,
X is a direct bond or $(C_{1-3})$alkylene,
n is 0 or 1
which compound, where n is 1, is in free acid or salt form.

2. A compound according to claim 1, in which X is $$-CH_2-, -CH_2CH_2-, -CH(CH_3)-, \text{ or } -CH_2CH_2CH_2-.$$

3. A compound according to claim 1, in which Y is Y' and $R_4$ is $R_4'$, where either, Y' is phenyl; methylphenyl; chlorophenyl; bromophenyl; $(C_{1-7})$alkyl; $(C_{1-7})$alkyl substituted by up to two halogen atoms; $(C_{2-5})$alkenyl; $(C_{2-5})$alkenyl substituted by up to two halogen atoms; or cyclohexyl and $R_4'$ is hydrogen, methyl or ethyl.

4. A compound according to claim 3, in which any alkyl as Y' contains 1 to 4 carbon atoms.

5. A compound according to claim 4, in which any alkyl as Y' contains 1 to 2 carbon atoms and any alkenyl contains 2 or 3 carbon atoms.

6. A compound according to claim 1, in which $R_1$ is a primary $(C_{1-9})$alkyl, secondary $(C_{3-9})$alkyl or cyclohexyl which is optionally substituted by up to three methyl groups, $R_2$ is hydrogen or methyl in a position para to the —NH— group and $R_3$ is hydrogen.

7. A compound according to claim 6, in which Y is Y" and $R_4$ is $R_4$", where either Y" is phenyl,

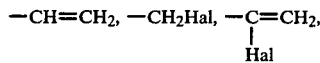

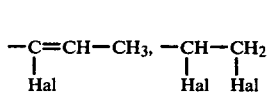

and R₄'' is hydrogen.

8. A compound according to claim 7 wherein X is

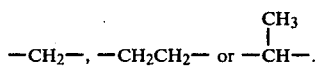

9. A compound according to claim 5, in which R₁ is R₁''', where R₁''' is secondary (C₆₋₉)alkyl or cyclohexyl which is optionally substituted by up to three methyl groups.

10. A compound according to claim 9, of formula I''

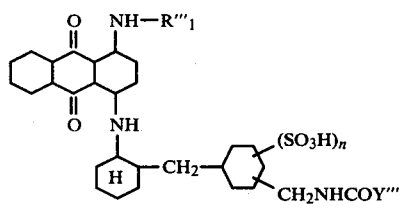

in which R''' is as defined in claim 9 and Y''' is

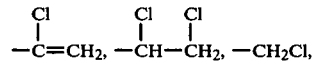

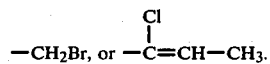

11. A compound according to claim 10, in which R₁ is cyclohexyl, 2-, 3-, or 4-methylcyclohexyl, 2,3-dimethylcyclohexyl, 3,3,5-trimethylcyclohexyl, or secondary (C₆₋₉)alkyl.

12. A compound according to claim 10, in which R₁ is other than (C₆₋₉)secondary alkyl.

13. A compound according to claim 6, in which X is

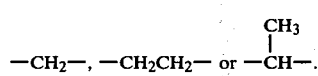

14. A compound according to claim 1, in which R₁ is secondary (C₃₋₉)alkyl or cyclohexyl which is optionally substituted by up to three methyl groups.

15. A compound according to claim 1, in which n is 1.

16. A compound according to claim 1, of formula,

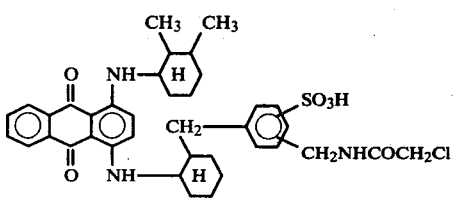

or of formula,

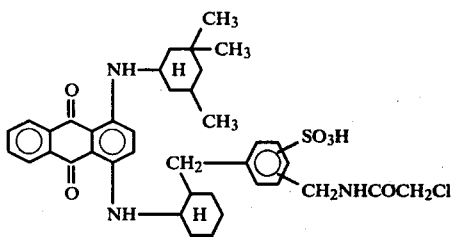

or of formula,

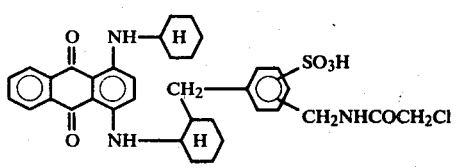

in free acid or salt form.

17. A compound according to claim 1 wherein R₁ is primary alkyl of 1 to 12 carbon atoms, secondary alkyl of 3 to 12 carbon atoms, tertiary alkyl of 4 to 12 carbon atoms, unsubstituted cyclohexyl or cyclohexyl substituted by up to 3 lower alkyl groups such that the total number of carbon atoms in such substituted cyclohexyl is up to 12.

18. A compound according to claim 17 wherein Y contains no hetero atoms and is either unsubstituted or bears substituents which may split off as anions.

19. A compound according to claim 17 wherein any substituent on Y is chlorine or bromine.

20. A compound according to claim 1, 7, 9, 18 or 8 wherein Y is Y'''' wherein Y'''' is

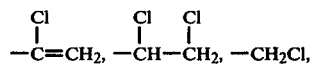

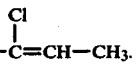

* * * * *